US008594002B2

(12) United States Patent
Kambhatla et al.

(10) Patent No.: US 8,594,002 B2
(45) Date of Patent: Nov. 26, 2013

(54) METHOD AND SYSTEM OF MAPPING DISPLAYPORT OVER A WIRELESS INTERFACE

(75) Inventors: Srikanth Kambhatla, Portland, OR (US); Guoqing Li, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 280 days.

(21) Appl. No.: 12/882,506

(22) Filed: Sep. 15, 2010

(65) Prior Publication Data

US 2012/0063376 A1 Mar. 15, 2012

(51) Int. Cl.
*H04B 7/00* (2006.01)

(52) U.S. Cl.
USPC .......................................................... 370/310

(58) Field of Classification Search
None
See application file for complete search history.

(56) References Cited

U.S. PATENT DOCUMENTS

| | | | | |
|---|---|---|---|---|
| 2007/0257923 | A1 | 11/2007 | Whitby-Strevens | |
| 2008/0297520 | A1 * | 12/2008 | Montag | 345/501 |
| 2009/0066704 | A1 * | 3/2009 | Daniel et al. | 345/501 |
| 2009/0161017 | A1 | 6/2009 | Glen | |
| 2009/0323562 | A1 * | 12/2009 | Cho et al. | 370/277 |
| 2011/0258300 | A1 * | 10/2011 | Hao et al. | 709/221 |

OTHER PUBLICATIONS

VESA DisplayPort Standard Version 1, Revision 1a.*
VESA E-EDID Standard ( Defines EDID structure 1.4) Release A, Revision 2 Sep. 25, 2006.*
Thesis : Path calculation and packet translation for UAV surveillance in support of wireless sensor networks Author: Stephen Schall Sep. 2006.*
IBM CICS Service Flow Runtime—User Guide Version 3 Release 1 Jul. 2010.*
Intel Sideband Technology 321786-002EN Revision 1.0 Jul. 2009.*
WirelessHD specification overview version 1.0a Aug. 2009.*
Huai-Rong Shao et al. Adaptive multi-beam transmission of uncompressed video over 60Ghz wireless system Dec. 2007 Conference publication: Future generation communication and networking (FGCN 2007).*
Kambhatla, Srikanth, et al., "Wireless Clone Mode Display", U.S. Appl. No. 12/877,152, filed Sep. 8, 2010.
PCT/US2011/049663 International Search Report with Written Opinion of the International Searching Authority mailed Feb. 29, 2012.

* cited by examiner

*Primary Examiner* — Otis L Thompson, Jr.
*Assistant Examiner* — Rina Pancholi
(74) *Attorney, Agent, or Firm* — Trop, Pruner & Hu, P.C.

(57) ABSTRACT

A method and system to facilitate the mapping of the DisplayPort standard over a wireless interface. The wireless interface uses a communication protocol that operates in accordance with, but is not limited to, a wireless gigabit alliance (WGA) standard, a Institute of Electrical and Electronics Engineers (IEEE) 802.11a/b/g, IEEE 802.11n, and other IEEE wireless standards, a Bluetooth standard, a Ultra-wideband (UWB) standard, and a 3rd Generation Partnership Project (3GPP) Long Term Evolution (LTE) standard. In one embodiment of the invention, it provides a definition for mapping the DisplayPort standard over a wireless interface to enable wireless display usage model with existing or new DisplayPort sink devices. The definition for mapping the DisplayPort standard over a wireless interface allows end-to-end interoperability of DisplayPort based wireless devices and facilitates the adoption of the definition as an industry standard in one embodiment of the invention.

15 Claims, 8 Drawing Sheets

300

600

| | | | | | | |
|---|---|---|---|---|---|---|
| 710 Feature list | 712 Comp. Cap. | 714 Audio delay | 716 Interlaced audio delay | 718 Audio buffer | 720 Video delay | 722 Interlaced video delay |

| | | | | |
|---|---|---|---|---|
| 724 Video buffer | 726 CP support | 728 E-EDID presence | 730 Vendor specific | 732 Interface type |

700

| 760 Value | 770 Interface type |
|---|---|
| 0 | HDMI |
| 1 | Display port |
| 2 | WGA native display |
| Others | Reserved |

750

```
810 PALME-A/V-InterfaceReg.request{
        InterfaceType
}

820 PALME-A/V-InterfaceReg.confirmation{
        ResultCode,
        ReasonCode
}

830 PALME-A/V-InterfaceUnReg.request{
        InterfaceType
}

840 PALME-A/V-InterfaceUnReg.confirmation{
        ResultCode,
        ReasonCode
}
```

800

FIG. 8

| 910 Transaction ID | 920 PT_Type | 930 PT_Content |
|---|---|---|

900

FIG. 9A

| 960 Value | 965 Packet type |
|---|---|
| 0x00 | HPD notify (long pulse) |
| 0x01 | HPD sink event |
| 0x02 | AUX channel transaction packet |
| 0x03 | Sideband message packet |
| 0x04 | Secondary packet |
| 0x05 | Video stream control packet |
| Others | Reserved |

| 970 Offset | 975 Content |
|---|---|
| 0x01 | MISC0 7:0 |
| 0x02 | MISC1 7:0 |
| 0x03 | Flags 7:0 |
| Others | Reserved |

| 980 Bit 7:6 | 985 Bit 0 |
|---|---|
| Reserved | Audio mute |

950

FIG. 9B

```
1010 PALME-A/V-PassthroughData.request {
        Peer STA address,
        PacketType,
        Length,
        Passthrough payload
}

1020 PALME-A/V-PassthroughData.confirmation {
        ResultCode,
        ReasonCode
}

1030 PALME-A/V-PassthroughData.indication {
        PacketType,
        Length,
        Pass through payload
}
```

1000

FIG. 10

METHOD AND SYSTEM OF MAPPING DISPLAYPORT OVER A WIRELESS INTERFACE

FIELD OF THE INVENTION

This invention relates to the DisplayPort standard, and more specifically but not exclusively, to a method and system to facilitate the mapping of the DisplayPort standard over a wireless interface.

BACKGROUND DESCRIPTION

The DisplayPort standard is a digital display interface standard put forth by the Video Electronics Standards Association (VESA). FIG. 1 illustrates a prior art DisplayPort wired topology or network 100. The prior art DisplayPort wired topology 100 has a source device 110 that is connected to a hub/branch device 120 via a DisplayPort communication link 140. The hub/branch device 120 is connected to a sink device 130 via another DisplayPort communication link 142. In other prior-art DisplayPort wired topology, the source device 110 may be connected directly to the sink device 130 via a DisplayPort communication link.

BRIEF DESCRIPTION OF THE DRAWINGS

The features and advantages of embodiments of the invention will become apparent from the following detailed description of the subject matter in which:

FIG. 8 illustrates the semantics of primitives in accordance with one embodiment of the invention;

FIG. 9A illustrates a format of a pass through packet in accordance with one embodiment of the invention;

FIG. 9B illustrates a configuration of a packet type field in accordance with one embodiment of the invention;

FIG. 10 illustrates the semantics of primitives in accordance with one embodiment of the invention;

DETAILED DESCRIPTION

Figure 1:
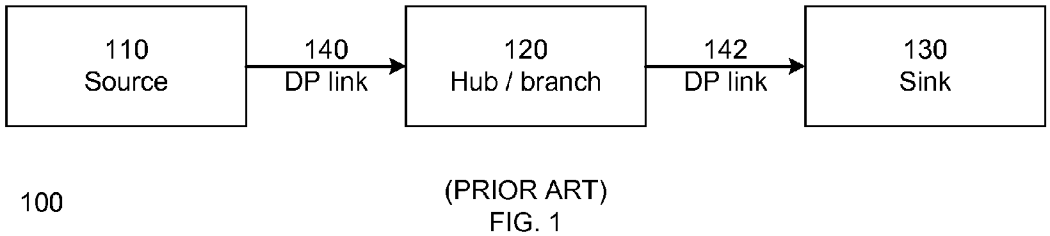
(PRIOR ART) FIG. 1
FIG. 1 illustrates a prior art DisplayPort wired topology.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment. While the invention has been described with respect to a limited number of embodiments, those skilled in the art will appreciate numerous modifications and variations therefrom. It is intended that the appended claims cover all such modifications and variations as fall within the true spirit and scope of this invention.

Embodiments of the invention provide a method and system to facilitate the mapping of the DisplayPort standard over a wireless interface. In one embodiment of the invention, the DisplayPort standard includes, but is not limited to, the DisplayPort standard version 1.2 ("DisplayPort standard", Rev 1.2 January 2010, Video Electronics Standards Association) and any other versions or revisions of the DisplayPort standard. In one embodiment of the invention, the wireless interface uses a communication protocol that operates in accordance with, but is not limited to, a wireless gigabit alliance (WGA) standard, a Institute of Electrical and Electronics Engineers (IEEE) 802.11a/b/g, IEEE 802.11n, and other IEEE wireless standards, a Bluetooth standard, a Ultra-wideband (UWB) standard, and a 3rd Generation Partnership Project (3GPP) Long Term Evolution (LTE) standard and the like.

In one embodiment of the invention, a definition for mapping the DisplayPort standard over the wireless interface is provided to enable wireless display usage models with existing or new DisplayPort sink devices. The definition for mapping the DisplayPort standard over the wireless interface allows end-to-end interoperability of the DisplayPort based wireless devices and facilitates the adoption of the definition as an industry standard in one embodiment of the invention.

Figure 2:
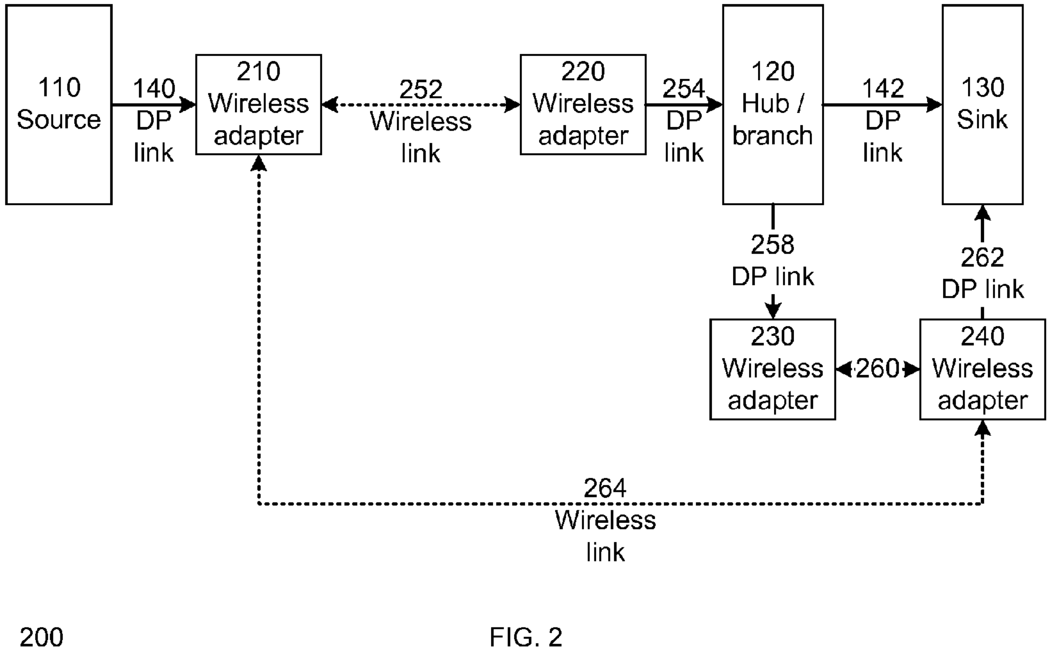
FIG. 2 illustrates a DisplayPort based wireless topology in accordance with one embodiment of the invention.

FIG. 2 illustrates a DisplayPort based wireless topology 200 in accordance with one embodiment of the invention. The DisplayPort based wireless topology 200 illustrates different usage models or configurations enabled by embodiments of the invention.

In one embodiment of the invention, the DisplayPort based wireless topology 200 has a source device 110 that is coupled with a wireless adapter 210 via a DisplayPort (DP) communication link 140. The wireless adapter 210 receives data or information from the source device 110 and converts or transforms the data into a format suitable for the wireless communication link 252. The wireless adapter 210 sends the converted data via the wireless communication link 252 to the wireless adapter 220.

The wireless adapter 220 receives the converted data and converts or transforms the received data into a data format compliant with the DisplayPort standard. The wireless adapter 220 sends the transformed received data via the DisplayPort communication link 254 to a hub/branch device 120. In one embodiment of the invention, the hub/branch device 120 forwards the data from the wireless adapter 220 directly to the sink device 130 via the DisplayPort communication link 142. In another embodiment of the invention, the hub/branch device 120 processes the data from the wireless adapter 220 before sending it to the sink device 130 via the DisplayPort communication link 142. The processing of the data includes, but is not limited to, determining the recipient device of the data received from the wireless adapter 220 and the like.

The wireless adapters 210 and 220 eliminates the need of a wired DisplayPort communication link between the source device 110 and the hub/branch device 120 in one embodiment of the invention. In another embodiment of the invention, the DisplayPort wired communication link 142 between the hub/branch device 120 and the sink device 130 can be eliminated by coupling the wireless adapters 230 and 240 to the hub/branch device 120 and the sink device 130 respectively. The wireless communication link 260 between the wireless adapters 230 and 240 replaces the DisplayPort wired communication link 142 in one embodiment of the invention.

In one embodiment of the invention, the wireless adapter 220 performs the functionality of the wireless adapter 230 and the hub/branch device 120 requires only a single wireless adapter to communicate with the source device 110 and the sink device 130. For example, in one embodiment of the invention, the wireless adapter 220 is able to communicate with the wireless adapter 240 to facilitate the communication between the hub/branch device 120 and the sink device 130 and is able communicate with the wireless adapter 210 to facilitate the communication between the hub/branch device 120 and the source device 110.

The DisplayPort based wireless topology 200 allows the existing source device 110, hub/branch device 120 and the sink device 130 to communicate wirelessly without any modification through the use of the wireless adapters in one embodiment of the invention. The DisplayPort based wireless topology 200 illustrated in FIG. 2 is not meant to be limiting and other variation of the topology can be used without affecting the workings of the invention. For example, in one embodiment of the invention, the DisplayPort based wireless topology 200 does not require the hub/branch device 120. The source device 110 communicates directly with the sink device 130 using the wireless communication 264 via the wireless adapters 210 and 240 respectively in one embodiment of the invention. The conversion of DisplayPort information by the wireless adapters includes, but is not limited to, data transformation, timing synchronization, encapsulation, and the like.

Figure 3:
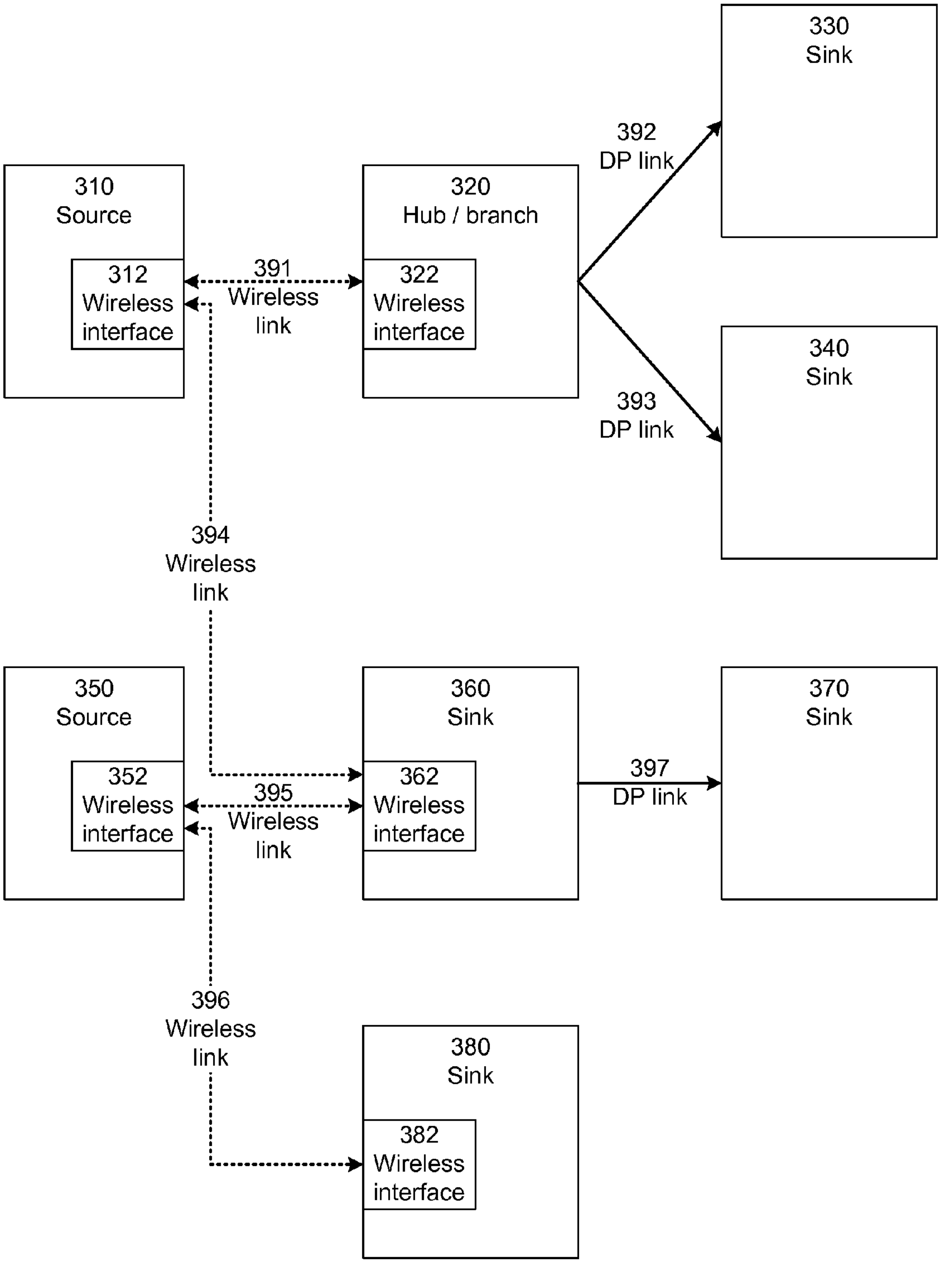
FIG. 3 illustrates a DisplayPort based wireless topology in accordance with one embodiment of the invention.

FIG. 3 illustrates a DisplayPort based wireless topology 300 in accordance with one embodiment of the invention. The DisplayPort based wireless topology 300 illustrates different usage models or configurations facilitated by embodiments of the invention.

In one embodiment of the invention, the DisplayPort based wireless topology 300 has a source device 310 that has a wireless interface 312. In one embodiment of the invention, the wireless interface 312 has a similar functionality as the wireless adapter 210 and it has logic to convert or transform the data in DisplayPort format of the source device 310 into a format suitable for the wireless communication links 391 and 394.

The source device 310 is coupled with the hub/branch device 320 via the wireless communication link 391. The hub/branch device 320 has a wireless interface 322 that operates with the same communication protocol as the wireless interface 312 of the source device 310. The hub/branch device 320 is coupled with the sink device 330 and 340 via the DisplayPort communication links 392 and 393 respectively. The source device 310 is also coupled with the sink device 360 via the wireless communication link 394.

The sink device 360 has a wireless interface 362 that allows it to communicate with the source device 310. In one embodiment of the invention, the sink device 360 acts as a pass through device to pass data from the source device 310 to the sink device 370 via the DisplayPort communication link 397. Although not shown in FIG. 3, the sink device 360 can also perform as a pass through device and can be daisy-chained to another one or more sink devices. In one embodiment of the invention, the sink device 370 is not limited to use the DisplayPort wired communication link 397 to couple or communicate with the sink device 360. The sink device 370 may also have a wireless interface (not shown in FIG. 3) to couple with the sink device 360.

In one embodiment of the invention, the source device 350 illustrates that the source device 350 can be coupled directly to the sink devices 360 and 380 via the wireless communication links 395 and 396 respectively without a hub/branch device. The DisplayPort based wireless topology 300 illustrated in FIG. 3 is not meant to be limiting and other variation of the topology can be used without affecting the workings of the invention. For example, in one embodiment of the invention, the DisplayPort based wireless topology 300 includes one or more wireless adapters 210, 220, 230 and 240. For example, in one embodiment of the invention, the sink device 370 is coupled with a wireless adapter that allows it to communicate with the sink device 360 via a wireless communication link.

In another embodiment of the invention, DisplayPort based wireless topology 300 uses more than one type of wireless communication protocol. For example, in one embodiment of the invention, the wireless interfaces 312 and 322 operate in accordance with the WGA standard and the wireless interfaces 352 and 362 operate in accordance with the Bluetooth standard. One of ordinary skill in the relevant art will readily how to modify the configuration of the DisplayPort based wireless topology 300 and these modifications shall not be described herein.

Figure 4:
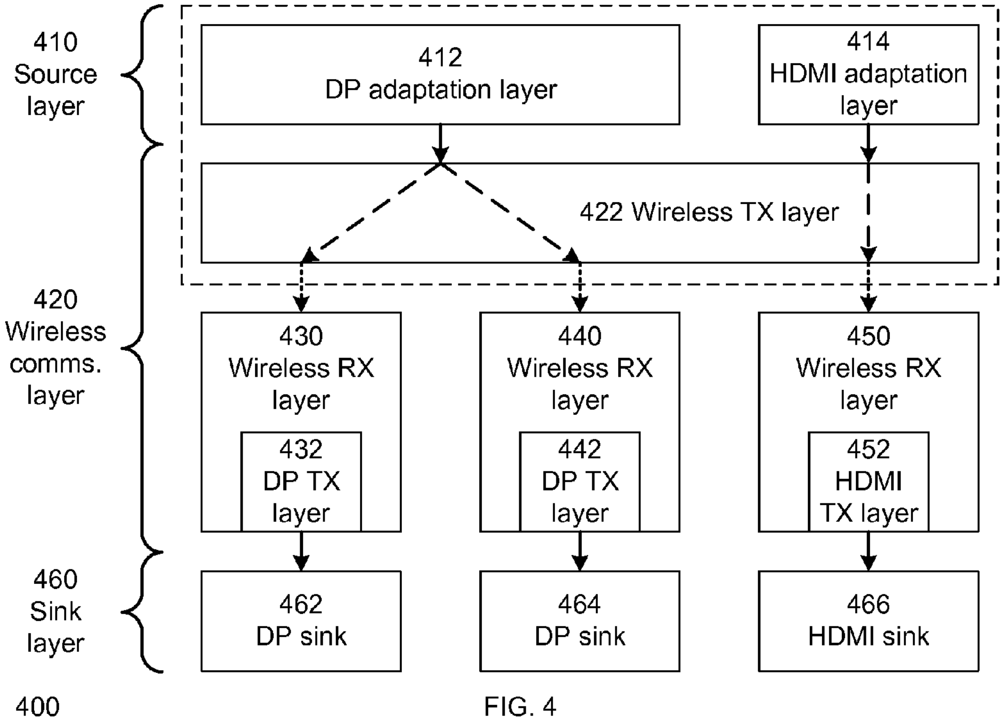
FIG. 4 illustrates a layering model of a DisplayPort based wireless topology in accordance with one embodiment of the invention.

FIG. 4 illustrates a layering model 400 of a DisplayPort based wireless topology in accordance with one embodiment of the invention. For clarity of illustration, FIG. 4 is discussed with reference to FIGS. 2 and 3. The layering model 400 includes, but is not limited to, a source layer 410, a wireless communication layer 420, and a sink layer 460. In one embodiment of the invention, the source layer 410 resides in a source device and it includes a DisplayPort adaptation layer logic 412, and/or a High-Definition Multimedia Interface (HDMI) adaptation layer logic 414. The HDMI adaptation layer logic 414 is compliant at least in part with the HDMI standard version 1.3a ("High-Definition Multimedia Interface", Specification Version 1.3a Nov. 10, 2006, HDMI Licensing) and any other versions or revisions of the HDMI standard.

In one embodiment of the invention, the DisplayPort adaptation layer logic 412 receives information in DisplayPort format and converts the information into a format that is readable or required by the wireless transmission (TX) layer logic 422. For example, in one embodiment of the invention, the wireless TX layer logic 422 is compliant at least in part with the WGA standard. The DisplayPort adaptation layer logic 412 receives DisplayPort data and converts or transforms the DisplayPort data into WGA data format. The conversion of the DisplayPort data includes, but is not limited to, encapsulation, addition of packet headers, and the like. Similarly, in one embodiment of the invention, the HDMI adaptation layer logic 414 receives information in DisplayPort format and converts the information into a format of the wireless TX layer logic 422.

The wireless TX layer logic 422 receives information from the DisplayPort adaptation layer logic 412 and/or the HDMI adaptation layer logic 414 and transmits the data via a wireless communication link. In one embodiment of the invention, the DisplayPort adaptation layer logic 412 sends information to the DisplayPort sink device 462 and 464 via the wireless receive (RX) layer logic 430 and 440 respectively. In one embodiment of the invention, the wireless RX layer logic 430 has a DisplayPort TX layer logic 432 that receives data from the wireless TX layer logic 422 and converts the received data into DisplayPort format. After conversion, the DisplayPort TX layer logic 432 sends the converted data to the DisplayPort sink device 462. The DisplayPort TX layer logic 442 in the wireless RX layer logic 440 has a similar functionality as the DisplayPort TX layer logic 432 and it shall not be described herein.

In one embodiment of the invention, the wireless adapters 210, 220, 230, and 240 and the wireless interfaces 312, 322, 352, 362 and 382 have one or more parts of the layering model 400. For example, in one embodiment of the invention, the wireless adapter 210 has the DisplayPort adaptation layer logic 412 that receives information from the source device 110 via the DisplayPort communication link 250. The DisplayPort adaptation layer logic 412 converts the received information into a format suitable for the wireless TX layer logic 422 in the wireless adapter 210. The wireless TX layer logic 422 reads the received information and transmits the received information via the wireless communication link 252.

In one embodiment of the invention, the HDMI adaptation layer logic 414 sends information to the HDMI sink device 466 via the wireless RX layer logic 450. In one embodiment of the invention, the wireless RX layer logic 450 has a HDMI TX layer logic 452 that receives data from the wireless TX layer logic 422 and converts the received data into HDMI format. After conversion, the HDMI TX layer logic 452 sends the converted data to the HDMI sink device 466.

The layering model 400 of the DisplayPort based wireless topology illustrated in FIG. 4 is not meant to be limiting. One of ordinary skill in the relevant art will readily appreciate that other variations of the layering model 400 can be used without affecting the workings of the invention. For example, in one embodiment of the invention, the layering model 400 has more than one DisplayPort adaptation layer logic.

Figure 5:
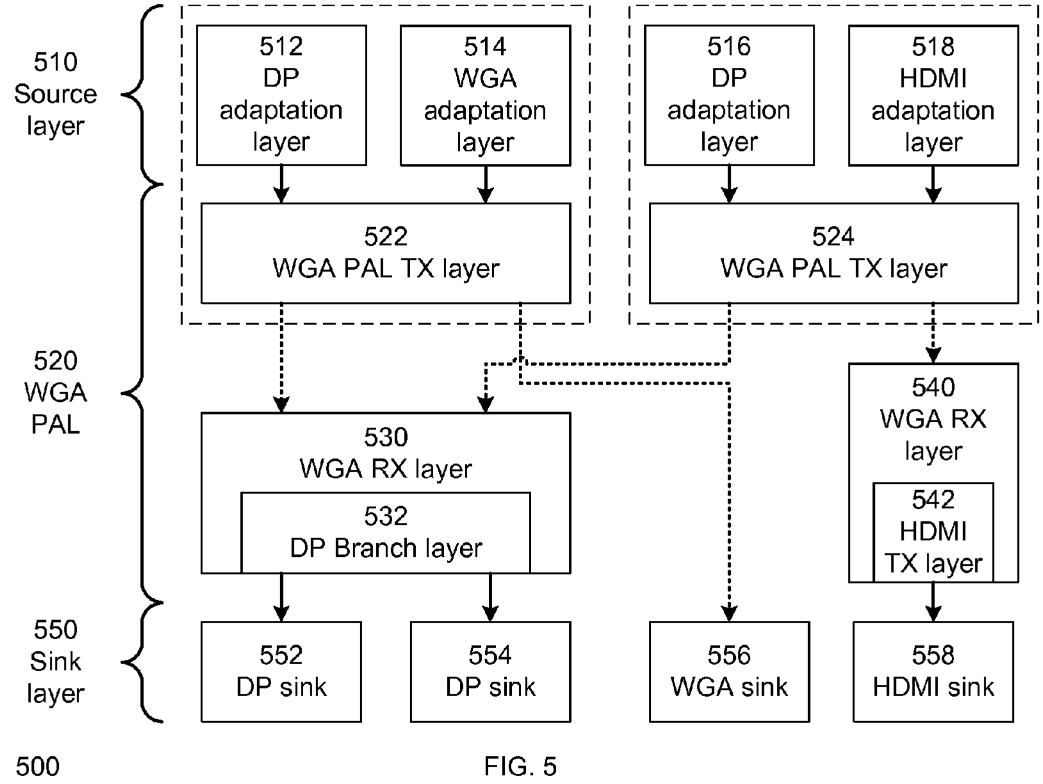
FIG. 5 illustrates a layering model of a DisplayPort based wireless topology in accordance with one embodiment of the invention.

FIG. 5 illustrates a layering model 500 of a DisplayPort based wireless topology in accordance with one embodiment of the invention. For clarity of illustration, the wireless communication is assumed to be compliant at least in part with the WGA standard. The layering model 500 includes, but is not limited to, a source layer 510, a WGA protocol adaptation layer (PAL) 520, and a sink layer 560. The layering model 500 illustrates two source devices. The first source device has the DisplayPort adaptation layer logic 512, and/or the WGA adaptation layer logic 514. The second source device has the DisplayPort adaptation layer logic 516, and/or a HDMI adaptation layer logic 518.

The DisplayPort adaptation layer logic 512 of the first source device sends information via the WGA PAL TX layer logic 522 to the WGA RX layer logic 530. The WGA RX layer logic 530 has a DisplayPort branch layer logic 532 to route the information from the DisplayPort adaptation layer logic 512 to the DisplayPort sink device 552. The WGA RX layer logic 530 is also able to receive information from the DisplayPort adaptation layer logic 516 of the second source device via the WGA PAL TX layer logic 524. The DisplayPort branch layer logic 532 in the WGA RX layer logic 530 routes the information from the DisplayPort adaptation layer logic 516 to the DisplayPort sink device 554.

The WGA adaptation layer logic 514 of the first source device sends information via the WGA PAL TX layer logic 522 to a WGA sink device 556. In one embodiment of the invention, the WGA sink device 556 has the WGA RX layer logic (not shown) to receive the data from the WGA PAL TX layer logic 522. In one embodiment of the invention, the HDMI adaptation layer logic 518 sends information to the HDMI sink device 558 via the wireless RX layer logic 540. In one embodiment of the invention, the wireless RX layer logic 540 has a HDMI TX layer logic 540 that receives data from the WGA RX layer logic 540 and converts the received data into the HDMI format. After conversion, the HDMI TX layer logic 542 sends the converted data to the HDMI sink device 558.

The layering model 500 of the DisplayPort based wireless topology illustrated in FIG. 5 is not meant to be limiting. One of ordinary skill in the relevant art will readily appreciate that other variations of the layering model 500 can be used without affecting the workings of the invention. For example, in other embodiments of the invention, the layering model 500 uses a different wireless communication protocol that is different from the WGA standard. One of ordinary skill in the relevant art will readily appreciate how to modify the layering model 500 of the DisplayPort based wireless topology illustrated in FIG. 5 for a different wireless communication protocol.

Figures 6, 7A, 7B:
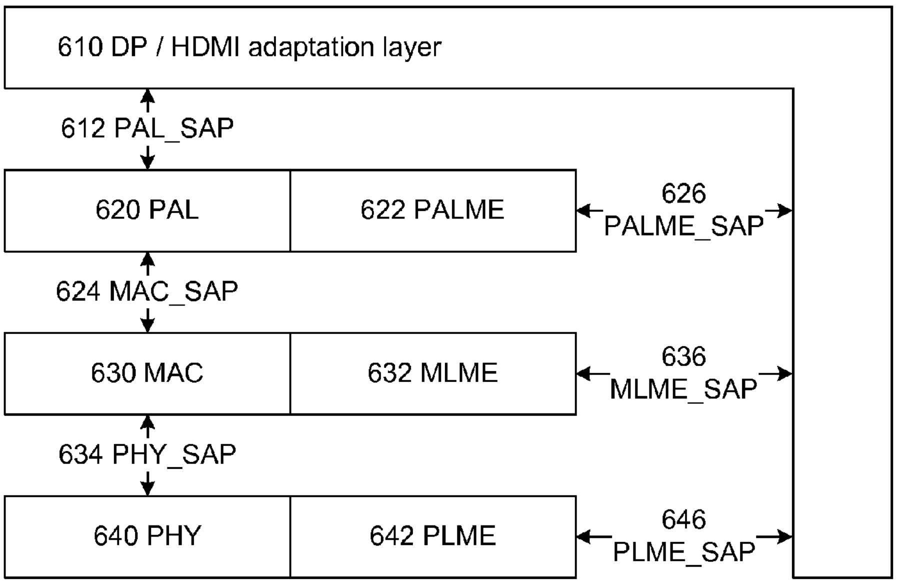
FIG. 6 illustrates a wireless gigabit alliance layering model of a DisplayPort based wireless topology in accordance with one embodiment of the invention.
FIG. 7A illustrates a format of a control packet in accordance with one embodiment of the invention.
FIG. 7B illustrates a configuration of an interface type field in accordance with one embodiment of the invention.

FIG. 6 illustrates a WGA layering model 600 of a DisplayPort based wireless topology in accordance with one embodiment of the invention. The WGA layering model 600 is implemented in a wireless transmitter and a wireless receiver in one embodiment of the invention. The wireless transmitter includes, but is not limited to, a wireless adapter, a source device with a wireless interface and the like. The wireless receiver includes, but is not limited to, a wireless adapter, a sink device with a wireless interface and the like.

The WGA layering model 600 has a physical layer (PHY) 640 that is coupled with a medium access control (MAC) layer 630 via a PHY service access point (PHY_SAP) 634. The MAC layer 630 is coupled with a Protocol Adaptation Layer (PAL) 620 via a MAC service access point (MAC_SAP) 624. The DisplayPort/HDMI adaptation layer 610 is coupled with the PAL 620 via a PAL service access point (PAL_SAP) 612.

The PHY 640 has a physical layer management entity (PLME) 642 that couples with the DisplayPort/HDMI adaptation layer 610 via the PLME service access point (PLME_SAP) 646. The MAC layer 630 has a MAC sublayer management entity (MLME) 632 that couples with the DisplayPort/HDMI adaptation layer 610 via the MLME service access point (MLME_SAP) 636. Similarly, the PAL 620 has a PAL management entity (PALME) 622 that couples with the DisplayPort/HDMI adaptation layer 610 via the PALME service access point (PALME_SAP) 626.

The WGA layering model 600 of the DisplayPort based wireless topology illustrated in FIG. 6 is not meant to be limiting. One of ordinary skill in the relevant art will readily appreciate how to modify the layering model of another wireless communication protocol to add or introduce the DisplayPort/HDMI adaptation layer 610.

FIG. 7A illustrates a format 700 of a control packet in accordance with one embodiment of the invention. For clarity of illustration, FIG. 7A is discussed with reference to FIG. 3. In one embodiment of the invention, before a wireless communication link is established between a wireless transmitter and a wireless receiver, the wireless transmitter sends an audio/video (A/V) capability request control packet or frame to the wireless receiver. The wireless receiver sends an A/V capability response control packet or frame to the wireless transmitter in response to receiving the A/V capability request control packet from the wireless transmitter.

For example, in one embodiment of the invention, the wireless interface logic 312 of the source device 310 sends an A/V capability request control packet to the wireless interface logic 322 of the hub/branch device 320. The hub/branch device 320 receives the NV capability request control packet and sends a NV capability response control packet to the source device 310.

In one embodiment of the invention, the format 700 or data structure of a control packet includes, but is not limited to, a feature list field 710, a compression capability field 712, an audio delay field 714, an interlaced audio delay field 716, an audio buffer field 718, an video delay field 720, an interlaced audio delay field 722, an video buffer field 724, a Copy Protection (CP) support field 726, an Enhanced Extended Display Identification Data (E-EDID) presence field 728, a vendor specific field 730, and an interface type field 732. The A/V capability request control packet and/or A/V capability response control packet includes one or more fields of the control packet 700 in one embodiment of the invention.

The sequence of the fields in the format 700 of the control packet is not meant to be limiting and the A/V capability request control packet and/or A/V capability response control packet may have any order of the fields illustrated in the format 700. The fields in the format 700 of the control packet may have a fixed bit/byte length, a variable bit/byte length or any other combination thereof.

FIG. 7B illustrates a configuration 750 of an interface type field 732 in accordance with one embodiment of the invention. For clarity of illustration, FIG. 7B is discussed with reference to FIG. 7A. In one embodiment of the invention, the interface type field 732 is set as one octet or eight bits.

The configuration 750 illustrates the possible values 760 that can be set in the interface type field 732 in one embodiment of the invention. The interface type 770 illustrates the corresponding interface type associated with the set value 760. For example, in one embodiment of the invention, when the interface type field 732 is set to a value of 0, it indicates that the HDMI interface is selected. When the interface type field 732 is set to a value of 1, it indicates that the DisplayPort interface is selected. Similarly, when the interface type field 732 is set to a value of 2, it indicates that the WGA native display interface is selected. The other unused settings of the interface type field 732 are reserved for other interfaces in one embodiment of the invention.

The configuration 750 of the interface type field 732 illustrated in FIG. 7B is not meant to be limiting and one of ordinary skill in the relevant art will readily appreciate that other configurations can be used without affecting the workings of the invention.

FIG. 8 illustrates the semantics 800 of the primitives in accordance with one embodiment of the invention. For clarity of illustration, FIG. 8 is discussed with reference to FIG. 6. In one embodiment of the invention, a wireless transmitter and/or a wireless receiver uses a PALME interface registration request (PALME-A/V-InterfaceReg.request) primitive 810 to register an interface within a PAL entity. In one embodiment of the invention, the interface type field in the PALME-A/V-InterfaceReg.request primitive 810 has the same setting as the interface type field 732 in the control packet.

For example, in one embodiment of the invention, when a wireless transmitter desires to register a DisplayPort interface, it sets the interface type field to a value of 1 in the PALME-A/V-InterfaceReg.request primitive 810 and sends the PALME-A/V-InterfaceReg.request primitive 810 to the PALME 622.

When the PAL entity within a wireless transmitter and/or a wireless receiver receives the PALME-A/V-InterfaceReg.request primitive 810, it determines whether the selected interface type can be registered. A PALME interface registration confirmation (PALME-A/V-InterfaceReg.confirmation) primitive 820 is used to confirm the result of the registration of an interface type within a PAL entity for the requested interface type. The result code field of the PALME-A/V-InterfaceReg.confirmation primitive 820 indicates whether the registration of the requested interface type is successful.

The PALME-A/V-InterfaceReg.confirmation primitive 820 has a reason code field to indicate the reason for the successful and/or unsuccessful registration of the requesting interface type. In one embodiment of the invention, the reason code field is not interpreted or read if the reason code field indicates a successful registration.

When PAL entity within a wireless transmitter and/or a wireless receiver wants to unregister or de-register a registered interface type, the wireless transmitter and/or the wireless receiver uses a PALME interface un-registration request (PALME-A/V-InterfaceUnReg.request) primitive 830 to de-register a registered interface type. For example, in one embodiment of the invention, when a transmitter desires to de-register a HDMI interface that has been registered, it sets the interface type field to a value of 0 in the PALME-A/V-InterfaceUnReg.request primitive 830 and sends the PALME-A/V-InterfaceUnReg.request primitive 830 to the PALME 622.

When the PAL entity within a wireless transmitter and/or a wireless receiver receives the InterfaceUnReg.request primitive 830, it determines whether the registered interface type can be de-registered. A PALME interface un-registration confirmation (PALME-A/V-InterfaceUnReg.confirmation) primitive 840 is used to confirm the result of the de-registration of the registered interface type within a PAL entity. The result code field of the PALME-A/V-InterfaceUnReg.confirmation primitive 840 indicates whether the de-registration of the registered interface type is successful.

The PALME-A/V-InterfaceUnReg.confirmation primitive 840 has a reason code field to indicate the reason for the successful and/or unsuccessful de-registration of the registered interface type. In one embodiment of the invention, the reason code is not interpreted or read if the reason code field indicates a successful de-registration.

FIG. 9A illustrates a format 900 of a pass through packet in accordance with one embodiment of the invention. For clarity of illustration, FIG. 9A is discussed with reference to FIG. 3. In one embodiment of the invention, a source device is coupled or daisy-chained to two or more sink devices, i.e., the source device 310 is coupled to the sink devices 360 and 370. In one embodiment of the invention, the source device 310 can send information to the sink device 370 via the sink device 360 by using pass through packets. The sink device 360 receives pass through packets from the source device 350 and sends the pass through packets to the sink device 370.

The format 900 of a pass through packet includes, but is not limited to, a transaction Identification (ID) field 910, a pass through type (PT_Type) field 920 and a pass through contents field (PT_Content) 930. In one embodiment of the invention, the transaction ID field 910 has a value that identifies a specific transaction of pass through data transfer. The PT_Type field 920 defines the type of content in the pass through packet and the PT_Content field 930 includes the pass through data.

FIG. 9B illustrates a configuration 950 of a packet type field 920 in accordance with one embodiment of the invention. For clarity of illustration, FIG. 9B is discussed with reference to 9A. In one embodiment of the invention, the configuration 950 illustrates the settings of the PT_Type field 920 in a pass through packet.

When the PT_Type field 920 is set to a value of 0x00, it indicates that the packet type 965 is a Hot Plug Detect (HPD) notify packet. When the PT_Type field 920 is set to a value of 0x01, it indicates that the packet type 965 is a HPD sink event packet. When the PT_Type field 920 is set to a value of 0x02, it indicates that the packet type 965 is an auxiliary (AUX) channel transaction packet. In one embodiment of the invention, the PT_Content field 930 of the AUX channel transaction packet is formatted in accordance with the definition of the AUX transfer syntax in the DisplayPort specification.

When the PT_Type field 920 is set to a value of 0x03, it indicates that the packet type 965 is a sideband message packet. In one embodiment of the invention, the PT_Content field 930 of the sideband message packet is formatted in accordance with the definition of the sideband SMG layer in the DisplayPort specification. When the PT_Type field 920 is set to a value of 0x04, it indicates that the packet type 965 is a secondary packet. In one embodiment of the invention, the PT_Content field 930 of the secondary packet is formatted in accordance with the definition of the secondary data packet format in the DisplayPort specification.

When the PT_Type field 920 is set to a value of 0x05, it indicates that the packet type 965 is a video stream control packet. In one embodiment of the invention, the video stream control packet has eight bits to store flag information, i.e., flags 7:0 in the contents 975 that is at an offset 970 of 0x03. The bits 7:6 980 are reserved and the bit 0 985 indicates the activation/deactivation of the audio mute function or feature.

In another embodiment of the invention, the configuration 950 of a packet type field is used in a Main Stream Attribute (MSA) packet and/or vertical blanking identification (VB-ID) packet. The MSA packet is sent once per video frame during a video blanking interval and includes, but is not limited to, video mode geometry information, synchronization (sync) polarity information, colour format information, stereoscopic three dimension (S3D) information and clock recovery information.

The VB-ID packet is sent from a DisplayPort source device to a DisplayPort sink device in every frame in one embodiment of the invention. The VB-ID packet includes, but is not limited to, vertical blanking presence information, active video stream information and audio mute information. The presence in the vertical blanking interval and presence of an active video stream is information that is available at the DisplayPort sink and may be transmitted only once during a connection setup. The audio mute must be sent every frame because it is dynamic and it may be communicated in the video stream control packet that is described hereinafter.

FIG. 10 illustrates the semantics 1000 of primitives in accordance with one embodiment of the invention. For clarity of illustration, FIG. 10 is discussed with reference to FIG. 6. In one embodiment of the invention, a wireless transmitter and/or a wireless receiver uses a PALME pass through data request (PALME-A/V-PassthroughData.request) primitive 1010 to request a PAL entity to transfer the pass through data to a peer PAL station or entity. The PALME-AN-PassthroughData.request primitive 1010 includes, but is not limited to, a peer station (STA) address field, a packet type field, a length field, and the pass through payload. In one embodiment of the invention, the interface type field in the PALME-A/V-PassthroughData.request primitive 1010 has the same setting as the interface type field 732 in the control packet.

When the PAL entity within a wireless transmitter and/or a wireless receiver receives the PALME-A/V-PassthroughData.request primitive 1010, it determines whether the pass through payload or data can be transferred. A PALME pass through data confirmation (PALME-A/V-PassthroughData.confirmation) primitive 1020 is used to confirm the result of the requested pass through data transfer from the requesting PAL entity. The result code field of the PALME-A/V-PassthroughData.confirmation primitive 1020 indicates whether the transfer of the pass through data is successful.

The PALME-A/V-PassthroughData.confirmation primitive 1020 has a reason code field to indicate the reason for the successful and/or unsuccessful transfer of the pass through data. In one embodiment of the invention, the reason code is not interpreted or read if the reason code field indicates a successful transfer.

The PALME pass through data indication (PALME-A/V-PassthroughData.indication) 1030 is used to indicate to the PAL entity of the received pass through data from a peer PAL. The PALME-NV-PassthroughData.request primitive 1010 includes, but is not limited to, a packet type field, a length field, and the pass through payload.

The information to be transmitted over a DisplayPort link may be handled separately based on the type of information in one embodiment of the invention. For example, in one embodiment of the invention, information that must be communicated every frame over the upstream wireless communication link is a first type of information. The information that does not need be transmitted because it is already available at the DisplayPort transmitter is a second type of information. A third type of information is the information that needs to be transmitted by the upstream source, but can be transmitted less often.

In one embodiment of the invention, the second type of information that does not change with each frame includes, but is not limited to, video mode geometry, synchronization polarity, and color format. The second type of information has static or non-varying information for each frame. To maximize the bandwidth of a DisplayPort based wireless topology, the second type of information is only sent once as part of an audio/video connection set up information by a DisplayPort source device. The DisplayPort sink device receives and stores the second type of information and uses the second type of information in each frame. As the second type of information is sent only once by the DisplayPort source device, the bandwidth of the DisplayPort based wireless topology can be increased in one embodiment of the invention.

Figure 11:
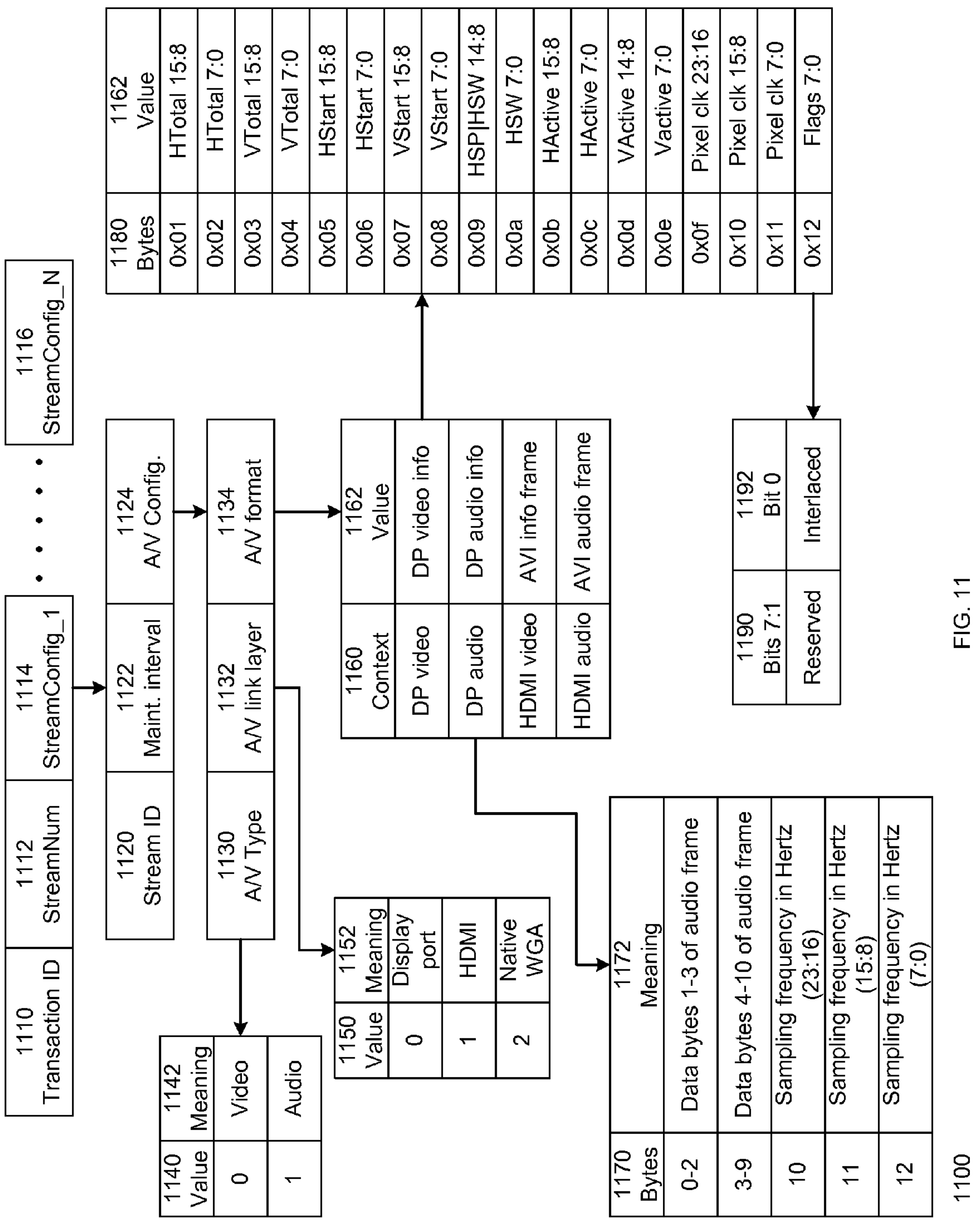
FIG. 11 illustrates a format of a connection setup in accordance with one embodiment of the invention.

FIG. 11 illustrates a format 1100 of a connection setup in accordance with one embodiment of the invention. For clarity of illustration, FIG. 11 is discussed with reference to FIG. 5. In one embodiment of the invention, the WGA PAL TX layer logic 522 performs a connection setup with the WGA RX layer logic 530 before a wireless communication link is established. In one embodiment of the invention, the connection setup includes, but is not limited to, a transaction ID field 1110, a stream number (StreamNum) field 1112, and N number of stream configuration fields as illustrated by the StreamConfig_1 field 1114 and StreamConfig_N field 1116.

In one embodiment of the invention, the transaction ID field 1110 has a value that identifies a specific transaction of A/V streaming. Each stream configuration field has three sub-fields, i.e., the StreamConfig_1 field 1114 includes, but is not limited to, the stream ID field 1120, the maintenance interval field 1122, and the A/V configuration field 1124. The A/V configuration field 1124 has three sub-fields, i.e., the A/V type field 1130, the A/V link layer field 1132, and the NV format field 1134.

In one embodiment of the invention, when the value 1140 of the A/V type field 1130 is set to 0, it indicates that the stream is a video stream. When the value 1140 of the A/V type field 1130 is set to 1, it indicates that the stream is an audio stream. In one embodiment of the invention, when the value 1150 of the A/V link layer field 1132 is set to 0, it indicates that the link layer is using the DisplayPort standard. When the value 1150 of the A/V link layer field 1132 is set to 1, it indicates that the link layer is using the HDMI standard. When the value 1150 of the A/V link layer field 1132 is set to 2, it indicates that the link layer is using the native WGA standard.

In one embodiment of the invention, the context 1160 and value 1162 of the A/V format field 1134 is dependent on the settings of the A/V type field 1130, the A/V link layer field 1132. For example, in one embodiment of the invention, when the A/V type field 1130 indicates a video stream and the A/V link layer field 1132 indicates that the link layer is using the DisplayPort standard, the context 1160 and value 1162 of the A/V format field 1134 is set as the DisplayPort video and the DisplayPort video information respectively. When the A/V type field 1130 indicates an audio stream and the A/V link layer field 1132 indicates that the link layer is using the DisplayPort standard, the context 1160 and value 1162 of the A/V format field 1134 is set as the DisplayPort audio and the DisplayPort audio information respectively.

Similarly, when the A/V type field 1130 indicates a video stream and the A/V link layer field 1132 indicates that the link layer is using the HDMI standard, the context 1160 and value 1162 of the A/V format field 1134 is set as the HDMI video and the Audio Video Interleaved (AVI) information frame respectively. When the A/V type field 1130 indicates an audio stream and the A/V link layer field 1132 indicates that the link layer is using the HDMI standard, the context 1160 and value 1162 of the A/V format field 1134 is set as the HDMI audio and the audio information frame respectively.

In one embodiment of the invention, when the context 1160 of the A/V format field 1134 is set as the DisplayPort audio, the context 1160 has 13 bytes of data. The bytes 0-2 of the context 1160 include the data bytes 1-3 of an audio information frame. The bytes 3-9 of the context 1160 include the data bytes 4-10 of an audio information frame. In one embodiment of the invention, the sampling frequency of the DisplayPort audio is set using 24 bits. The bytes 10, 11, and 12 of the context 1160 include the bits 23:16, bits 15:8, and bits 7:0 respectively of the sampling frequency in hertz.

In one embodiment of the invention, the DisplayPort video information includes video geometry information that is represented from bytes 0x01 to 0x0e. The video geometry information includes S3D information in one embodiment of the invention. It is an example of the first type of information that can be sent every frame because of the critical timing coordination needed between control and data planes.

One of ordinary skill in the relevant art will readily appreciate the video geometry information and it shall not be described herein.

The bytes 0x0f, 0x10 and 0x11 of the DisplayPort video information represent a 24 bit pixel clock and bytes 0x0f of the DisplayPort video information represents the 8 bit flags (Flags 7:0). The bit 0 of the Flags 7:0 indicates whether the video is interlaced and the bits 7:1 are reserved. In one embodiment of the invention, the clock recovery information includes the timing details of pixel clock values. The system management entity on a receiver determines the N and N values. These do not need to be sent over-the-air and, instead, pixel clock metadata, to enable derivation of M and N, may be sent over the air so that this information may be derived at the appropriate receiver in one embodiment of the invention.

In one embodiment of the invention, the audio information frame packet is sent only during an audio/video (A/V) connection setup phase by a wireless transmitter. The wireless receiver receives the audio information frame packet from the wireless transmitter and reproduces the audio information frame packet for each video frame associated with the audio information frame packet. By doing so, duplicate information is not sent by the wireless transmitter and the communication bandwidth can be improved.

Figure 12:
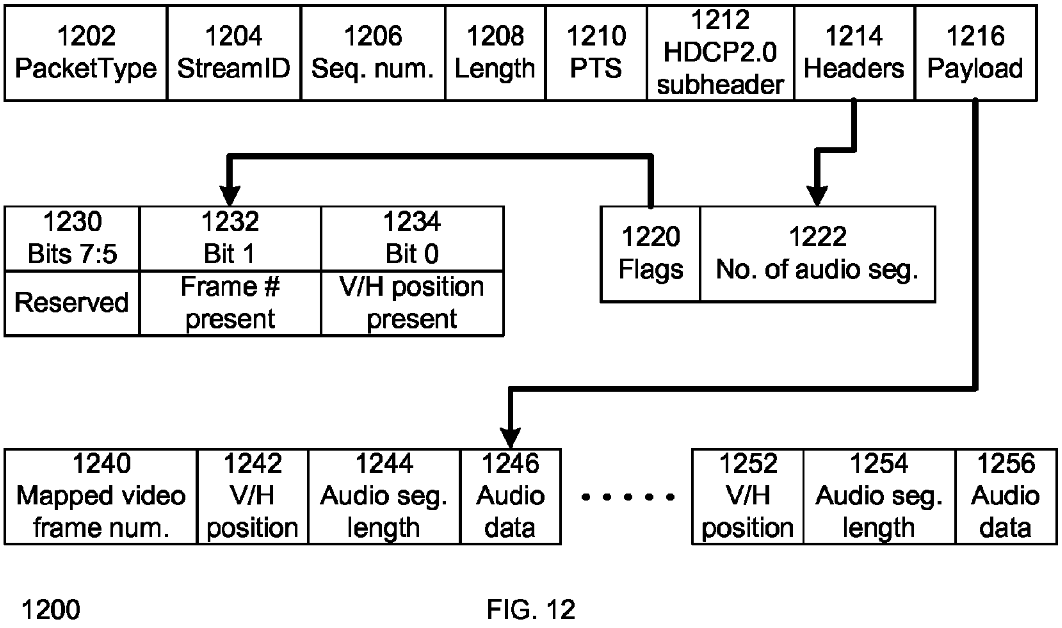
FIG. 12 illustrates a format of an audio data transmission in accordance with one embodiment of the invention.

FIG. 12 illustrates a format 1200 of an audio data transmission in accordance with one embodiment of the invention. In one embodiment of the invention, an audio data transmission includes, but is not limited to, a packet type field 1202, a stream ID field 1204, a sequence number field 1206, a length field 1208, a position time stamp (PTS) field 1210, a High-bandwidth Digital Content Protection (HDCP) version 2.0 ("HDCP Interface Independent Adaptation", Revision 2.0, 23 Oct. 2008, Digital Content Protection LLC) field 1212, a headers field 1214, and a payload field 1216.

In one embodiment of the invention, the headers field 1214 includes, but is not limited to, a flags field 1220 and a number of audio segments field 1222. In one embodiment of the invention, the flags field 1220 has 8 bits and bit 0 1234 indicates whether the vertical/horizontal (V/H) position is present in the payload 1216. The bit 1 1232 indicates whether the mapped video frame number is present in the payload field 1216 and the bits 7:5 are reserved.

In one embodiment of the invention, the receiver uses the vertical/horizontal (V/H) position and the frame number to synchronize the audio data in the payload field 1216 with its corresponding video data or stream. If the vertical/horizontal (V/H) position and the frame number are not available in the audio data in the payload field 1216, the receiver uses the PTS field 1210 to synchronize the audio data in the payload field 1216 with its corresponding video data or stream.

The payload field 1216 includes, but is not limited to, the mapped video frame number field 1240, the V/H position field 1242, the audio segment length field 1244, and the audio data 1246. If the bit 0 1234 indicates that the vertical/horizontal (V/H) position is present and the bit 1 1232 indicates that the mapped video frame number is present, the mapped video frame number field 1240 and the V/H position field 1242 are set. If the bit 0 1234 indicates that the vertical/horizontal (V/H) position is not present and the bit 1 1232 indicates that the mapped video frame number is not present, the mapped video frame number field 1240 and the V/H position field 1242 are not set.

The V/H position field 1252, the audio segment length field 1254, and the audio data 1256 illustrate that more than one set of audio data can be sent as the payload. For example, in one embodiment of the invention, when the number of audio segments field 1222 is set to 4, four sets of audio data is present in the payload field 1216.

Figure 13:
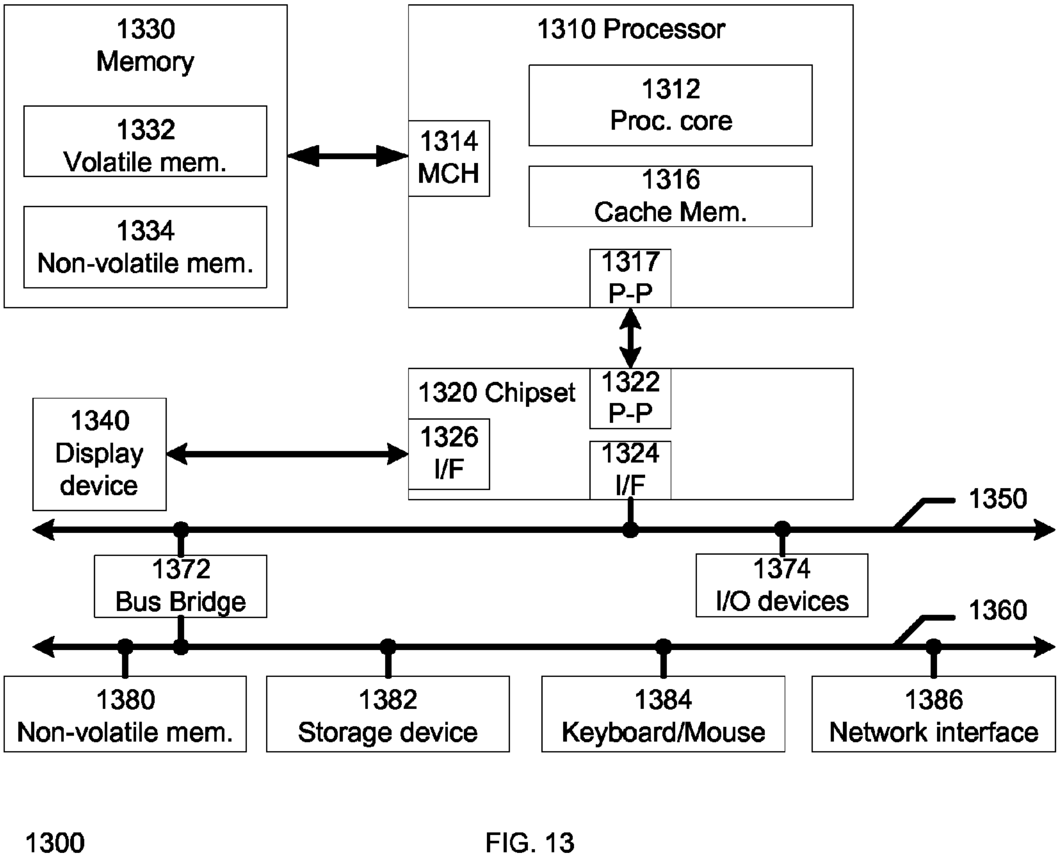
FIG. 13 illustrates a system to implement the methods disclosed herein in accordance with one embodiment of the invention.

FIG. 13 illustrates a system 1300 to implement the methods disclosed herein in accordance with one embodiment of the invention. The system 1300 includes, but is not limited to, a desktop computer, a laptop computer, a netbook, a notebook computer, a personal digital assistant (PDA), a server, a workstation, a cellular telephone, a mobile computing device, an Internet appliance or any other type of computing device. In another embodiment, the system 1300 used to implement the methods disclosed herein may be a system on a chip (SOC)

system. In one embodiment of the invention, the system 1300 implements a source device and/or sink device.

The processor 1310 has a processing core 1312 to execute instructions of the system 1300. The processing core 1312 includes, but is not limited to, pre-fetch logic to fetch instructions, decode logic to decode the instructions, execution logic to execute instructions and the like. The processor 1310 has a cache memory 1316 to cache instructions and/or data of the system 1300. In another embodiment of the invention, the cache memory 1316 includes, but is not limited to, level one, level two and level three, cache memory or any other configuration of the cache memory within the processor 1310.

The memory control hub (MCH) 1314 performs functions that enable the processor 1310 to access and communicate with a memory 1330 that includes a volatile memory 1332 and/or a non-volatile memory 1334. The volatile memory 1332 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 1334 includes, but is not limited to, NAND flash memory, phase change memory (PCM), read only memory (ROM), electrically erasable programmable read only memory (EEPROM), or any other type of non-volatile memory device.

The memory 1330 stores information and instructions to be executed by the processor 1310. The memory 1330 may also stores temporary variables or other intermediate information while the processor 1310 is executing instructions. The chipset 1320 connects with the processor 1310 via Point-to-Point (PtP) interfaces 1317 and 1322. The chipset 1320 enables the processor 1310 to connect to other modules in the system 1300. In one embodiment of the invention, the interfaces 1317 and 1322 operate in accordance with a PtP communication protocol such as the Intel® QuickPath Interconnect (QPI) or the like. The chipset 1320 connects to a display device 1340 that includes, but is not limited to, liquid crystal display (LCD), cathode ray tube (CRT) display, or any other form of visual display device.

In addition, the chipset 1320 connects to one or more buses 1350 and 1355 that interconnect the various modules 1374, 1360, 1362, 1364, and 1366. Buses 1350 and 1355 may be interconnected together via a bus bridge 1372 if there is a mismatch in bus speed or communication protocol. The chipset 1320 couples with, but is not limited to, a non-volatile memory 1360, a mass storage device(s) 1362, a keyboard/mouse 1364 and a network interface 1366. The mass storage device 1362 includes, but is not limited to, a solid state drive, a hard disk drive, an universal serial bus flash memory drive, or any other form of computer data storage medium. The network interface 1366 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 13 are depicted as separate blocks within the system 1300, the functions performed by some of these blocks may be integrated within a single semiconductor circuit or may be implemented using two or more separate integrated circuits. For example, although the cache memory 1316 is depicted as a separate block within the processor 1310, the cache memory 1316 can be incorporated into the processor core 1312 respectively. The system 1300 may include more than one processor/processing core in another embodiment of the invention.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. An apparatus comprising:

a DisplayPort adaptation layer logic coupled with a wireless communication interface logic, the DisplayPort adaptation layer logic to send a control packet indicating a DisplayPort interface is to be used for communication, said wireless communication interface logic to convert DisplayPort data to a format suitable for wireless communication;

wherein the DisplayPort adaptation layer logic is further to send a Pass Through (PT) packet comprising a transaction identification (ID), a PT type and data; and wherein the PT type comprises a video stream control packet, a Hot Plug Detect (HPD) notify (long pulse) packet, a HPD sink event packet, an auxiliary (AUX)

channel transaction packet, a sideband message packet and a secondary data packet.

2. The apparatus of claim 1, wherein the control packet comprises one of an Audio/Video (A/V) capability request control frame and an A/V capability response frame.

3. The apparatus of claim 1, wherein the DisplayPort adaptation layer logic is further to:
- send a request primitive to register the DisplayPort interface; and
- receive a confirmation primitive indicating a result of the registration of the DisplayPort interface.

4. The apparatus of claim 1, wherein the DisplayPort adaptation layer logic is further to:
- send a confirmation primitive in response to receiving a request primitive to register a DisplayPort interface.

5. The apparatus of claim 1, wherein the DisplayPort adaptation layer logic is further to:
- send a request primitive to de-register a DisplayPort interface; and
- receive a confirmation primitive indicating a result of the de-registration of the DisplayPort interface.

6. The apparatus of claim 1, wherein the DisplayPort adaptation layer logic is further to:
- send a confirmation primitive in response to receiving a request primitive to de-register a DisplayPort interface.

7. The apparatus of claim 1, wherein the wireless communication interface logic is operable at least in part with one of a wireless gigabit alliance (WGA) standard, a Institute of Electrical and Electronics Engineers (IEEE) 1302 wireless family of standards, a Bluetooth standard, a Ultra-wideband (UWB) standard, and a 3rd Generation Partnership Project (3GPP) Long Term Evolution (LTE) standard.

8. A method to map DisplayPort standard over a wireless communication interface, the method comprising:
- sending a control packet by a DisplayPort source device to a DisplayPort sink device indicating a DisplayPort interface is to be used for wireless communication between the source device and the sink device;
- sending a pass through (PT) data request primitive by a DisplayPort adaptation logic in the DisplayPort source device to request a transfer of pass through data;
- sending a pass through data indication primitive by the DisplayPort adaptation logic in the DisplayPort source device to indicate a packet type, a length, and a payload of the pass through data in response to receiving a pass through data request confirmation primitive; and
- wherein the PT type comprises a video stream control packet, a Hot Plug Detect (HPD) notify (long pulse) packet, a HPD sink event packet, an auxiliary (AUX) channel transaction packet, a sideband message packet and a secondary data packet.

9. The method of claim 8, wherein the control packet comprises one of an Audio/Video (A/V) capability request control frame and an A/V capability response frame.

10. The method claim of claim 8, further comprising:
- sending a request primitive by a DisplayPort adaptation logic in the DisplayPort source device to register the DisplayPort interface; and
- receiving a confirmation primitive by the DisplayPort adaptation logic in the DisplayPort source device indicating a result of the registration of the DisplayPort interface.

11. The method claim of claim 8, further comprising:
- sending a confirmation primitive by a management entity in the DisplayPort source device in response to receiving a request primitive to register the DisplayPort interface.

12. The method claim of claim 8, further comprising:
- sending a request primitive by a DisplayPort adaptation logic in the DisplayPort source device to de-register a DisplayPort interface; and
- receiving a confirmation primitive by the DisplayPort adaptation logic in the DisplayPort source device indicating a result of the de-registration of the DisplayPort interface.

13. The method claim of claim 8, further comprising:
- sending a confirmation primitive by a management entity in the DisplayPort source device in response to receiving a request primitive to de-register a DisplayPort interface.

14. The method claim of claim 8, further comprising:
- sending a pass through data request confirmation primitive by a management entity in the DisplayPort source device in response to receiving a pass through data request request primitive to request a transfer of pass through data.

15. An apparatus comprising:
- a DisplayPort adaptation layer logic coupled with a wireless communication interface logic, the DisplayPort adaptation layer logic to send static information only during an audio/video (A/V) connection setup phase;
- sending a pass through (PT) data request primitive by a DisplayPort adaptation logic in the DisplayPort source device to request a transfer of pass through data;
- sending a pass through data indication primitive by the DisplayPort adaptation logic in the DisplayPort source device to indicate a packet type, a length, and a payload of the pass through data in response to receiving a pass through data request confirmation primitive; and
- wherein the PT type comprises a video stream control packet, a Hot Plug Detect (HPD) notify (long pulse) packet, a HPD sink event packet, an auxiliary (AUX) channel transaction packet, a sideband message packet and a secondary data packet.

* * * * *